United States Patent [19]
Lee

[11] Patent Number: 5,676,485
[45] Date of Patent: Oct. 14, 1997

[54] BALL JOINT USED FOR STEERING ARRANGEMENT OR JOINT OF SUSPENSION SYSTEM OF AUTOMOBILE

[75] Inventor: Hee Bang Lee, Kyungsangnam-do, Rep. of Korea

[73] Assignee: Central Corporation, Kyungsangnam-do, Rep. of Korea

[21] Appl. No.: 623,642

[22] Filed: Mar. 28, 1996

[51] Int. Cl.[6] ............................................. F16C 7/00
[52] U.S. Cl. ......................... 403/135; 403/50; 277/212 FB
[58] Field of Search .............................. 403/50, 51, 135, 403/130, 131, 315; 277/212 FB

[56] References Cited

U.S. PATENT DOCUMENTS

| | | | |
|---|---|---|---|
| 3,389,926 | 6/1968 | Gottschald | 403/51 |
| 4,430,016 | 2/1984 | Matsuoka et al. | 403/135 X |
| 4,613,251 | 9/1986 | Bellamy et al. | 403/135 |
| 4,693,628 | 9/1987 | Renk | 403/135 |
| 5,152,628 | 10/1992 | Broszat et al. | 403/135 X |
| 5,489,161 | 2/1996 | Sugita et al. | 277/212 FB X |

*Primary Examiner*—Anthony Knight
*Attorney, Agent, or Firm*—Lieberman & Nowak, LLP

[57] ABSTRACT

A ball joint used for a steering arrangement or a suspension system of automobiles, comprises a housing having an inner side formed into a polygonal shape; a ball seat having an outer body surface formed as the same polygonal shape as formed in the housing; vertical flanges being formed at a closing portion of the ball seat and spaced apart at intervals corresponding to sides of the polygonal shape, each vertical flange having first and second fixing protrusions formed at an opening portion of the ball seat, and a hook protrusion having a groove formed at an inner surface of a lower portion of each vertical flange; and, a cap having a convex portion at a side and inserted in the vertical flanges so as to be fixed to the vertical flanges.

11 Claims, 5 Drawing Sheets

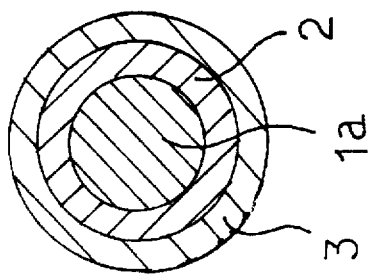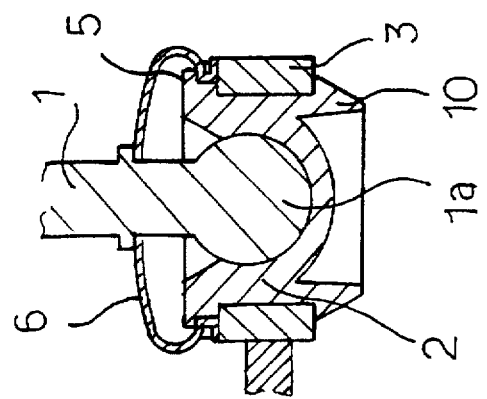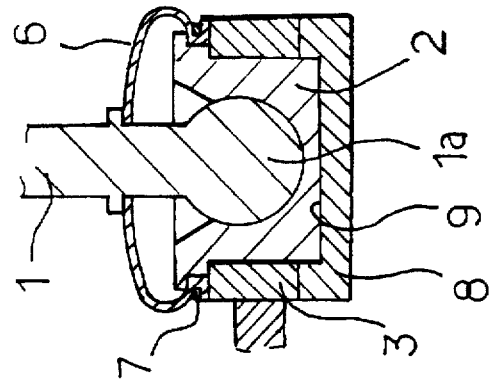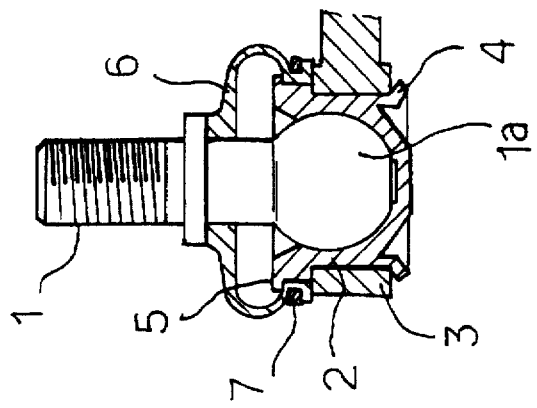

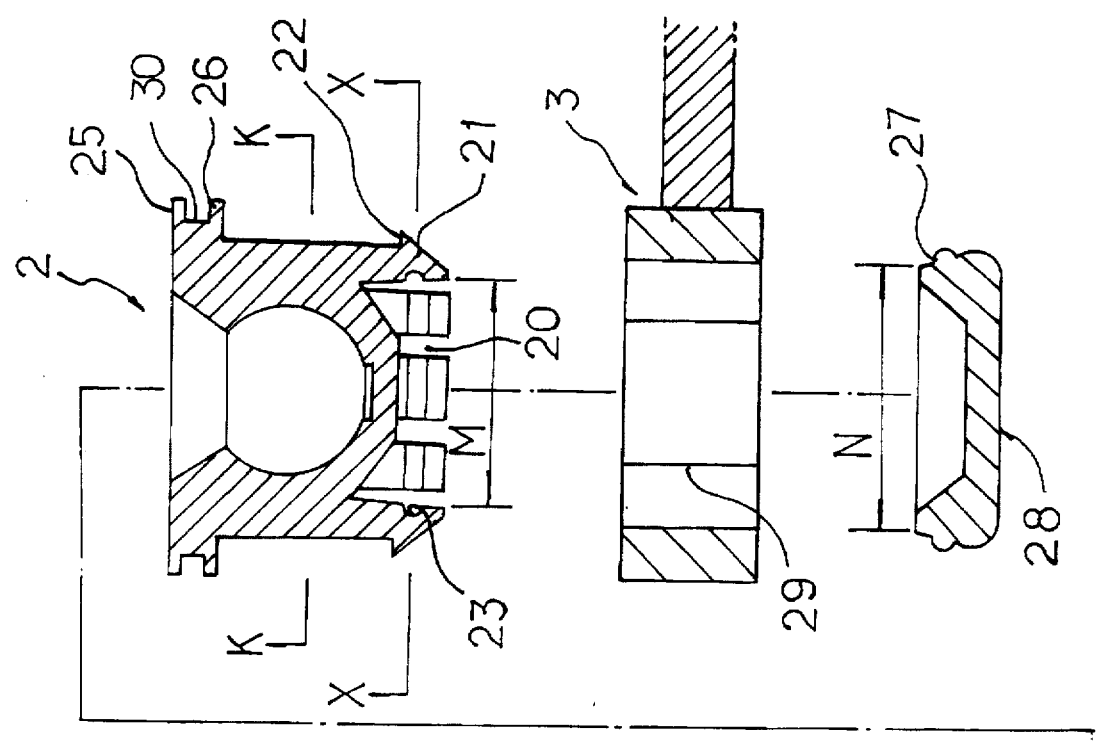
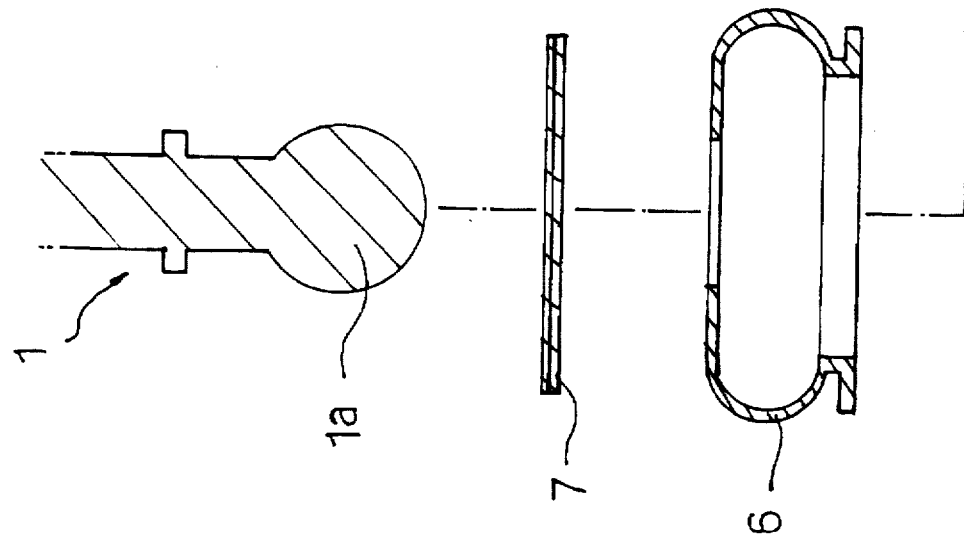
FIG. 5

BALL JOINT USED FOR STEERING ARRANGEMENT OR JOINT OF SUSPENSION SYSTEM OF AUTOMOBILE

BACKGROUND OF THE INVENTION

The present invention relates to a ball joint, and more particularly to a ball joint used for a steering arrangement or a suspension system of automobiles.

In the ball joint used for the steering arrangement or the suspension system of automobiles, a ball head of a ball stud is inserted inside a ball seat and the ball seat is fixed in a housing. A dust cover is fixed between the housing and a step of the ball seat.

Referring to FIGS. 1A through 1D, a conventional ball joint will be described hereunder.

FIG. 1A shows a ball joint disclosed in Japanese Laid-Open Patent hey 1-172610. In the drawing, a ball seat 2 where a ball head 1a of a ball stud 1 is movably inserted is inserted in a housing 3. Then, a combining plate 4 provided at a closed portion of ball seat 2 is heated to be bent outwardly so that combining plate 4 is hook-combined with the lower portion of housing 3. That is, a dust cover 6 is fixed by a rib 7 at a groove formed between a hook protrusion 5 of ball seat 2 and a step of housing 3.

In such a ball joint, combining plate 4 provided at the lower portion of ball seat 2 is heated and melted to be bent to the outward of the lower portion of housing 3, thus being hook-combined. To prevent ball seat 2 inserted into housing 3 from rotating, a V-shaped fixing groove (not shown) is provided at the step of housing 3 where combining plate 4 of ball seat 2 is hook-combining being melted by heating. Thus, combining pallet 4 of ball seat 3 being melted into the fixing groove can prevent the rotation of ball seat 2 inserted in housing 2.

However, such a ball joint must be additionally provided with the V-shaped fixing groove, and the combining plate must be heated causing burdensome during a manufacturing process. The combining strength between the ball seat and the housing is increased when the thickness of the combining plate formed on the ball seat, however, when the combining plate is thickened, there remains a trouble of melting the same.

As shown in FIG. 1B, U.S. patent Ser. No. 5,001,321 discloses a ball joint in which housing 3 where a support formed of a metallic material is welded is provided. After ball seat 2 formed of a plastic material where ball head 1a of ball stud is inserted into housing 3, a covering cap 8 formed of a plastic material is welded to the lower portion of ball seat 2 by an ultrasonic vibrator. While welding protrusions 9 formed on covering cap 8 are melted and welded, ball seat 2 is fixed to housing 3, accordingly.

However, the technology that ball seat 2 is fixed to housing 3 by welding covering cap 8 to ball seat 2 requires an additional equipment, and further, requires an additional apparatus for verifying the welding state. Though the verification apparatus is employed, it is impossible to verify a state of weldment of covering cap 8 onto ball seat 2 with a proper intensity.

As shown in FIG. 1C, Japanese utility laid-open No. Hey 5-23852 discloses the ball joint. An outwardly bent annulate hook protrusion 10 is made a closing portion ball seat 2 where ball head 1a of ball stud 1 is inserted. Annulate hook protrusion 10 is hooked and fixed at the lower portion of housing 3, and thus, ball seat 2 is fixed to housing 3. The diameter of annulate hook protrusion 10 formed at the closing portion of ball seat 2 is formed to be greater than that of ball seat 2.

However, in such a ball joint, it is problems that annulate hook protrusion 10 gets damaged when ball seat 2 is inserted in housing 3, and a combining strength of annulate hook protrusion 10 of ball seat 2 being hooked and fixed to housing 3 is weak.

That is, ball seat 2 is generally inserted by using a tool (not shown). Accordingly, when ball seat 2 does not uniformly receive force from the tool for inserting ball seat 2 into housing 3, ball seat 2 get twisted. Also, when a twisted ball seat 2 is assembled into housing 3, annulate hook protrusion 10 is easily broken since the diameter of annulate hook protrusion 10 is formed to be greater than that of ball seat 2. When ball seat 2 slips out of housing 3 by a vertical force of ball stud 1 during operation of the ball joint, annulate hook protrusion 10 cannot cope with the force and thus get damaged.

In the conventional ball joints shown in FIGS. 1A through 1C, dust cover 5 is fixed by metal rib 7 at the groove formed between the upper portion of housing 3 and hook protrusion 5 formed at an open portion of ball seat 2 so that the dust cover can be easily tared due to stress by ball joint operation (shaking and rotating). It is also problem that the automation of a process of the ball joint assembly becomes difficult since dust cover 6 must be fixed after ball seat 2 is inserted in housing 3.

That is, since dust cover 6 is fixed between the upper portion of metal housing 3 and hook protrusion 5 formed at ball seat 2, either ball seat 2 or housing 3 shakes and rotates, causing stress to dust cover 6.

Also, since dust cover 6 must be fixed at the groove formed between ball seat 2 and housing 3 after ball seat is inserted in housing 3, the fixing of dust cover 6 has been a barrier to the automation of the precess.

SUMMARY OF THE INVENTION

To solve the above problems, it is an object of the present invention to provide a ball joint which is fixed by providing first and second hook protrusions at an opening portion of a ball seat and fixing a dust cover with a rib to a combining groove formed on the first and second hook protrusions.

Accordingly, to achieve the above object, there is provided a ball joint used for a steering arrangement or a suspension system of automobiles, in which an interior of a housing is made into an octagon; an outer body surface of a ball seat is formed as the same shape as the polygon formed on the housing; vertical flanges are formed at a closing portion of the ball seat by interposing of an interval as many as the number of polygonal shape formed on the housing and the ball seat; first and second fixing protrusions is formed at the opening portion of the vertical flange; a hook protrusion where a groove is formed at the inner surface of the lower portion of the vertical flange is made; and a cap having a convex portion at a side thereof is made and inserted in the vertical flange so as to be fixed to the vertical flange.

BRIEF DESCRIPTION OF THE DRAWINGS

The above objects and advantages of the present invention will become more apparent by describing in detail a preferred embodiment thereof with reference to the attached drawings in which:

FIGS. 1A–1C are vertical sections illustrating a conventional ball joint, and FIG. 1D is a cross section of the ball joints shown in FIGS. 1A–1C respectively;

FIG. 5 is an exploded cross section of the ball joint of the present invention.

DETAILED DESCRIPTION OF THE INVENTION

For the convenience of the description, the present invention will be described with an example where an interior side of a housing and body of a ball seat is formed to an octagon.

Figure 2:
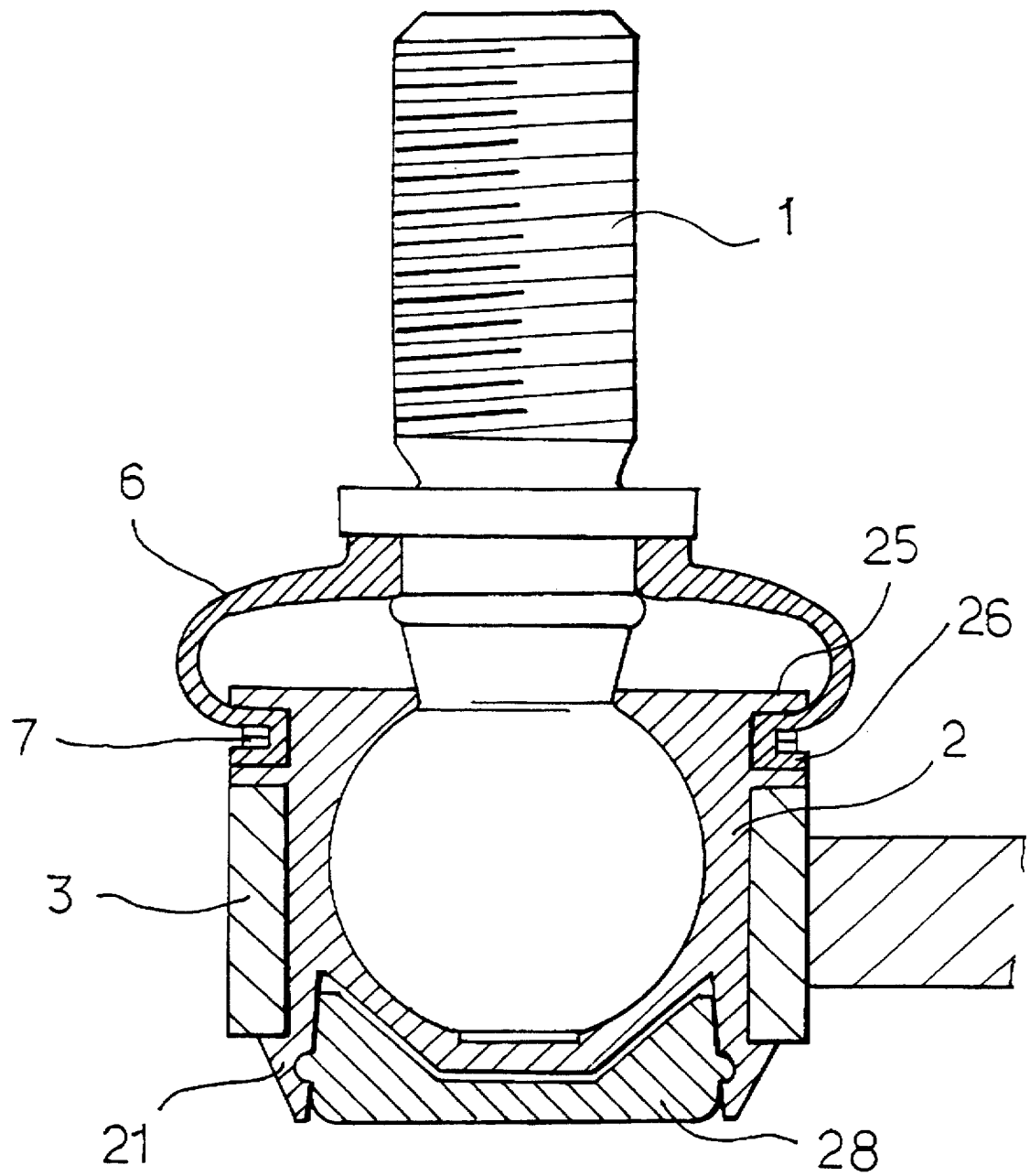
FIG. 2 is a vertical section of a ball joint according to the present invention.
Figure 4B:
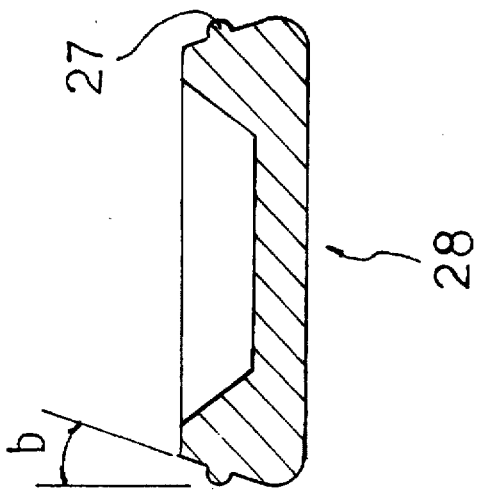
FIGS. 4A and 4B are vertical sections of the ball seat and a cap of the present invention.
Figure 4A:
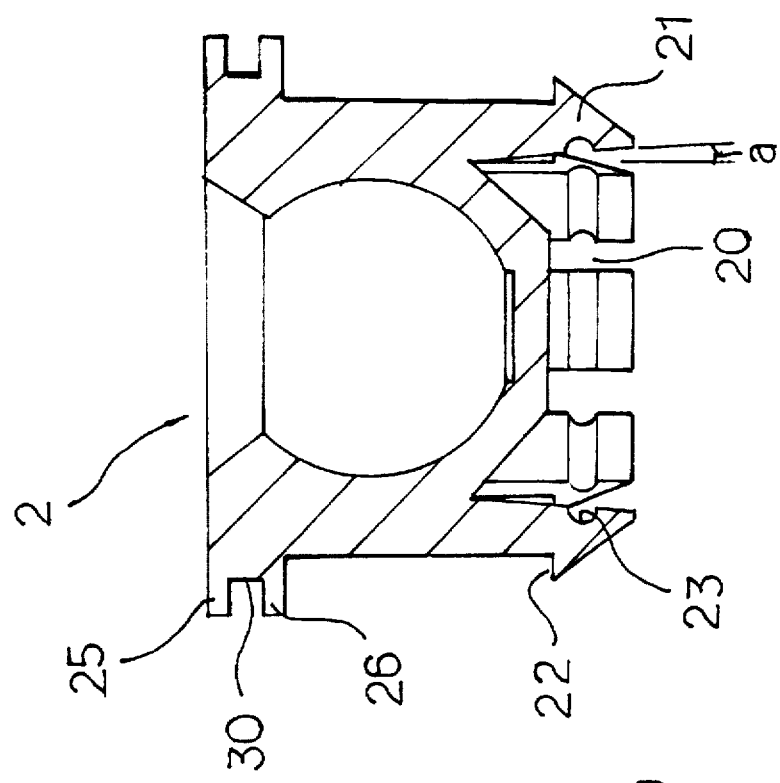
Figure 3:
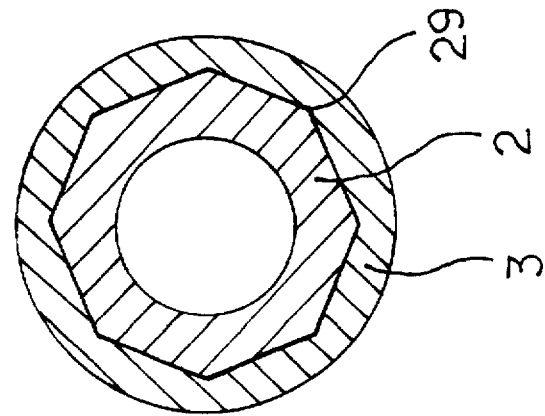
FIG. 3 is a cross section of a ball joint according to the present invention.
Figure 6A:
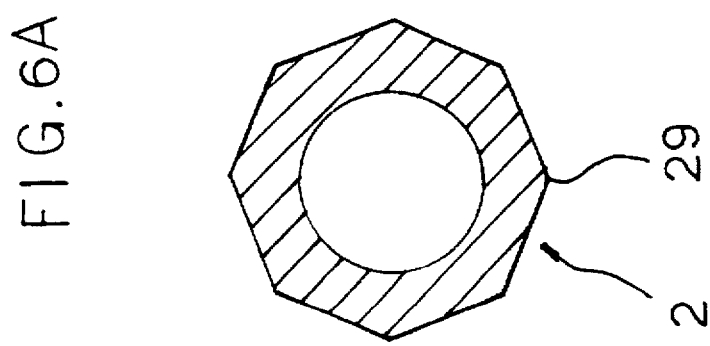
FIGS. 6A and 6B are sections taken along the line K—K and X—X, respectively.
Figure 6B:
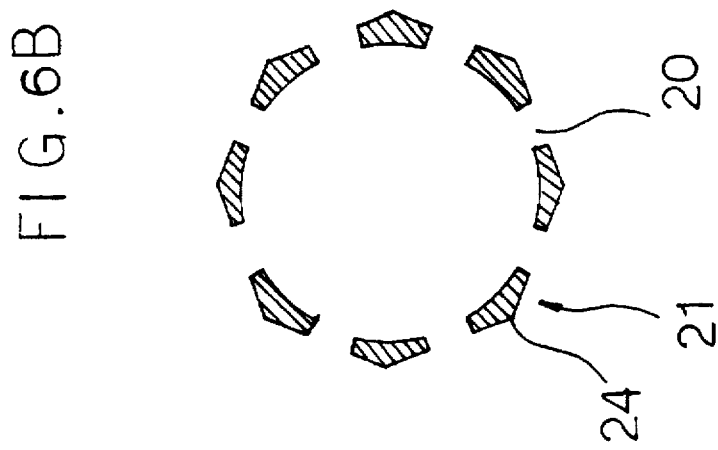
Figure 6C:
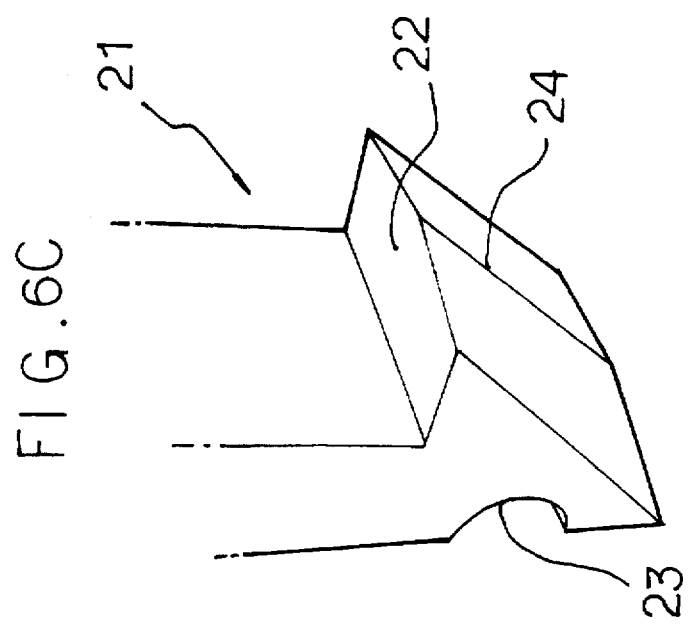
FIG. 6C is an amplified perspective view of a flange of the present invention.

Referring to FIGS. 2 through 8, the interior of housing 3 and the body of ball seat 2 are made into an octagon, and eight vertical flanges 21 are formed at a closing portion of ball seat 2 by interposing of an interval 20. A hook protrusion 22 having a groove 23 at the inside thereof is formed at the lower portion of vertical flange 21. A protruding side 24 is made at the central portion of an outer surface of hook protrusion 12. A first and second fixing protrusions 25 and 26 are made with a predetermined interval at an opening portion of ball seat 2. A cap 28 having a convex 27 at a side thereof is made by additionally injecting plastics.

An outer side of the ball seat body and an interior surface of housing 3 are congruously made into an octagon. The octagon of the ball seat body is formed between second fixing protrusion 26 and vertical flange 21. Protruding side 24 formed at the central portion of the outer surface of hook protrusion 22 of vertical flange 21 is made following an extended line of side 29 of the octagon formed on ball seat 2. That is, side 29 of the octagon formed on the outer surface of ball seat 2 and protruding side 24 formed on the outer surface of hook protrusion 22 are positioned along the same extended line.

The outer surface of vertical flange 21 formed on the closing portion of ball seat 2 is positioned on the same vertical extended line as the outer surface of ball seat 2. The inner surface of vertical flange 21 is formed to be outwardly slant at a predetermined angle of "a," preferably about 5°.

The width of interval 20 formed between vertical flanges 21 is preferably formed to be same as or less than that of each vertical flange 21. Protruding side 24 formed on the outer surface of hook protrusion 22 of vertical flange 21 is formed on the central portion of the outer surface of hook protrusion 22. Groove 23 is formed on the inner surface of hook protrusion 22 along the circumference.

The diameter of the outermost portion of hook protrusion 22 is made greater than that of outer surface of ball seat 2 and concurrently less than that of first and second fixing protrusions 25 and 26 formed at the opening portion of ball seat 2.

Both first and second fixing protrusions 25 and 26 are formed into a circle of the same diameter. Thus, a fixing groove 30 is formed between first and second fixing protrusions 25 and 26.

Cap 28 formed of a hardened plastics is provided with a convex 27 on the outer surface being slant as much as at an angle of "b." The predetermined slant angle "b" is preferably about 5°, inwardly of cap 28. The slant angle "b" is made to be greater or same as the slant angle "a" of the flange.

In the ball joint if such a structure, ball head 1a of ball stud 1 is inserted into ball seat 2, and dust cover 6 is combined by rib 7 at fixing groove 30 formed between first and second hook protrusions 25 and 26.

After the dust cover is combined to the fixing groove of the ball seat, protruding side 24 formed on the outer surface of hook protrusion 22 of vertical flange 21 being matched to octagonal side 29 of housing 3 is inserted into housing 3, thus side portions 29 and 24 being geared with each other and serving as a guide. When protruding side 24 of hook protrusion 24 and octagonal side 29 of housing 3 is assembled being geared with each other, octagonal side 29 formed on ball seat 2 is consequently assembled being geared with octagonal side 29 of the inner surface of housing 3.

Particularly, when ball seat 2 passes through the interior of housing 3, vertical flange is elastically reduced by interval 20. After passing the interior of housing 3, hook protrusions 22 of vertical flange 21 being reduced to the initial state is loosely hooked on the lower portion of housing 3 and thus temporarily combined.

The closing portion of ball seat 2 inserted to housing 3 is temporarily combined to a step portion of housing 3 by means of hook protrusion 22 of vertical flange 21. Second fixing protrusion 26 at the opening portion of ball seat 2 is hooked on the other step portion of housing 3, and thus, ball seat 2 is assembled to housing 3.

Since cap 28 of which the outer diameter "N" is to be formed at least greater than the inner diameter "M" of vertical flange 21 is inserted in vertical flange 21 formed at the closing portion of ball seat 2 after ball seat 2 is assembled housing 3, vertical flange 21 is outwardly extended, and thus, hook protrusion 22 is closely hooked and fixed to the step portion of housing 3. The combining of groove 23 of hook protrusion 22 and convex 27 of cap 28 prevents vertical flange 21 from being escaped.

To facilitate the insertion of cap 28 into vertical flange 21 and further increase combining strength of groove 27 with convex 23, the inner surface of vertical flange 21 is made to be outwardly slanted at an inclination angle of "a" and the side surface of cap 28 is made to be inwardly slanted at an inclination angle of "b." Accordingly, cap 28 can be easily inserted in vertical flange 21, and also, the combining strength can be increased.

As described above, in the ball joint according to the present invention, the fixing groove to which the dust cover is fixed is additionally formed at the opening portion of the ball seat by the first and second hook protrusions. Thus, not only the dust cover is a little stricken by stress during the operation of the ball joint, but also automation of a process for fixing the dust cover can be easily performed.

Further, since each side portion is geared with each other when the ball seat is assembled into the housing, the twisting phenomenon of the ball seat due to unbalanced force applied to the ball seat being assembled into the housing can be prevented. Since the interval is formed between the vertical flanges and thus the hook protrusion of the vertical flange made to be a bit greater than the inner diameter of the housing is elastically reduced, damage of the vertical flange can be prevented. Each side formed on the ball seat and the housing gets geared with each other, the problem that the ball seat rotates inside the housing during the operation of the ball joint is cleared up.

Also, since the cap is inserted into the vertical flange with the groove and the concave being geared up with each other, the closing portion of the ball seat is fixed to the housing. Therefore, the ball seat is prevented from escaping out of the housing during the operation of the ball joint.

What is claimed is:

1. A ball joint used for a steering arrangement or a suspension system of automobiles comprising a ball stud having a ball head; a ball seat having vertical flanges at a power portion thereof, a housing; said ball joint being made through manufacturing steps wherein said ball head of said ball stud is inserted into said ball seat; a dust cover is fixed by a rib between first and second fixing protrusions of said ball seat and then assembled in said housing; a cap is inserted in a vertical flange of said ball seat assembled in said housing and thus said ball seat is fixed to said housing.

2. A ball joint used for a steering arrangement or a suspension system of automobiles comprising:

a housing having an inner side formed into a polygonal shape;

a ball seat having an outer body surface formed as the same polygonal shape as formed in said housing;

vertical flanges being formed at a closing portion of said ball seat and spaced apart at intervals corresponding to sides of said polygonal shape, each said vertical flange having first and second fixing protrusions formed at an opening portion of said ball seat, and a hook protrusion having a groove formed at an inner surface of a lower portion of each said vertical flange; and, a cap having a convex portion at a side thereof and inserted in said vertical flanges so as to be fixed to said vertical flange.

3. A ball joint used for a steering arrangement or a suspension system of automobiles according to claim 1, wherein said polygonal shape is octagonal, said ball seat having eight spaced apart vertical flanges at the closing portion of said ball seat.

4. A ball joint used for a steering arrangement or a suspension system of automobiles according to claim 1, wherein a protruding side is formed at an outer center of said hook protrusion of each said vertical flange.

5. A ball joint used for a steering arrangement or a suspension system of automobiles according to claim 4, wherein the outer body surface of said ball seat and said protruding side of the outer surface of said hook protrusion of said vertical flange are disposed on the same vertical line.

6. A ball joint used for a steering arrangement or a suspension system of automobiles according to claim 4, wherein the outer body surface of said ball seat and said protruding side of the outer surface of said hook protrusion of said vertical flange are disposed on the same vertical line.

7. A ball joint used for a steering arrangement or a suspension system of automobiles according to claim 6, wherein said inclination angle of the outer surface of said cap is either congruous with or greater than that of the inner surface of said vertical flange.

8. A ball joint used for a steering arrangement or a suspension system of automobiles according to claim 2, wherein the inner surface of said vertical flange formed at the closing portion of said ball seat is made slant to have an inclination angle of $3°-7°$.

9. A ball joint used for a steering arrangement or a suspension system of automobiles according to claim 8, wherein said inclination angle of the outer surface of said cap is either congruous with or greater than that of the inner surface of said vertical flange.

10. A ball joint used for a steering arrangement or a suspension system of automobiles according to claim 2, wherein the outer surface where said convex of said cap is made with an inclination angle of $3°-7°$.

11. A ball joint used for a steering arrangement or a suspension system of automobiles according to claim 2, wherein the widths of said vertical flange and said interval formed at the closing portion of said ball seat are congruous.

* * * * *